(12) United States Patent
Hatam-Tabrizi et al.

(10) Patent No.: US 6,324,130 B1
(45) Date of Patent: Nov. 27, 2001

(54) DISC DRIVE SUSPENSION AND HEAD

(75) Inventors: Shahab Hatam-Tabrizi, San Jose; Hong Khuu, Fremont, both of CA (US)

(73) Assignee: Maxoptix Corporation, Fremont, CA (US)

( * ) Notice: Subject to any disclaimer, the term of this patent is extended or adjusted under 35 U.S.C. 154(b) by 0 days.

(21) Appl. No.: 09/235,147

(22) Filed: Jan. 21, 1999

(51) Int. Cl.$^7$ .................................................. G11B 11/00
(52) U.S. Cl. .............................................. 369/13; 360/114
(58) Field of Search ................................ 369/13, 14, 284, 369/282, 283, 286, 275.1, 44.22, 44.38, 44.39, 111, 112.01; 360/114, 59

(56) References Cited

U.S. PATENT DOCUMENTS

| | | |
|---|---|---|
| 4,449,138 | 5/1984 | Ando . |
| 4,788,671 | 11/1988 | Kanda . |
| 4,807,204 | 2/1989 | Mizutani et al. . |
| 4,965,780 | 10/1990 | Lee et al. . |
| 5,004,307 | 4/1991 | Kino et al. . |
| 5,020,041 | 5/1991 | Nakao et al. . |
| 5,105,408 | 4/1992 | Lee et al. . |
| 5,121,256 | 6/1992 | Corle et al. . |
| 5,124,961 | 6/1992 | Yamaguchi et al. . |
| 5,125,750 | 6/1992 | Corle et al. . |
| 5,150,338 | 9/1992 | Birecki et al. . |
| 5,161,134 | 11/1992 | Lee . |
| 5,191,563 | 3/1993 | Lee et al. . |
| 5,197,049 | 3/1993 | Wehrenbert . |
| 5,197,050 | 3/1993 | Murakami et al. . |
| 5,202,880 | 4/1993 | Lee et al. . |
| 5,247,510 | 9/1993 | Lee et al. . |
| 5,255,260 | 10/1993 | Yamada et al. . |
| 5,276,674 | 1/1994 | Tanaka . |
| 5,287,334 | 2/1994 | Iwabuchi et al. . |
| 5,295,122 | 3/1994 | Murakami et al. . |
| 5,303,100 | 4/1994 | Nakayama et al. . |
| 5,307,336 | 4/1994 | Lee et al. . |
| 5,470,627 | 11/1995 | Lee et al. . |
| 5,497,359 | 3/1996 | Mamin et al. . |
| 5,533,001 | 7/1996 | Watanabe et al. . |
| 5,594,708 | 1/1997 | Chaya . |
| 5,604,005 | 2/1997 | Endo et al. . |
| 5,625,607 | 4/1997 | Chaya . |
| 5,712,842 | 1/1998 | Yamamoto et al. . |
| 5,745,443 | 4/1998 | Yoshida et al. . |
| 5,745,464 | 4/1998 | Taguchi et al. . |
| 5,786,078 | 7/1998 | Sekiya et al. . |

(List continued on next page.)

FOREIGN PATENT DOCUMENTS

| | | |
|---|---|---|
| 0341829A2 | 11/1989 | (EP) . |
| 0549237A2 | 6/1993 | (EP) . |
| 0867873A2 | 9/1998 | (EP) . |
| 0992989A1 | 4/2000 | (EP) . |
| 1039458A2 | 9/2000 | (EP) . |
| 8-212579 | 8/1996 | (JP) . |
| WO 99/35645 | 7/1999 | (WO) . |

*Primary Examiner*—Ali Neyzari
(74) *Attorney, Agent, or Firm*—Blakely Sokoloff Taylor & Zafman, LLP

(57) ABSTRACT

A magneto-optical (MO) disc drive including a novel suspension, slider body, airbearing surface, and magnetic head. The MO disc drive includes a fine-focus actuator block including an objective lens, wherein the coarse carriage block moves radially above a surface of an MO disc to position the objective lens. The MO disc drive also includes a flat suspension having a first end and a second end, wherein the first end is fixedly attached to the fine-focus actuator block and the second end is attached to the coarse carriage block. A gimbal is moveably attached to an opening in a surface of the suspension and a magnetic head assembly is attached to the gimbal. The magnetic head assembly is loaded and unloaded by the load/unload mechanism independent of the objective lens and attached to the coarse actuator.

17 Claims, 20 Drawing Sheets

U.S. PATENT DOCUMENTS

| | | |
|---|---|---|
| 5,790,483 | 8/1998 | Kawai . |
| 5,828,644 | 10/1998 | Gage et al. . |
| 5,838,646 | 11/1998 | Watanabe et al. . |
| 5,859,814 | 1/1999 | Kino et al. . |
| 5,881,042 | 3/1999 | Knight . |
| 5,910,932 | 6/1999 | Watanabe et al. . |
| 5,914,915 | 6/1999 | Watanabe et al. . |
| 5,970,037 | 10/1999 | Kanazawa et al. . |
| 6,055,222 | 4/2000 | Knight . |
| 6,061,322 | 5/2000 | Jain et al. . |
| 6,069,853 | 5/2000 | Novotny et al. . |
| 6,104,675 * | 8/2000 | Hatam-Tabrizi ............ 369/13 |
| 6,130,863 * | 10/2000 | Wang et al. ............ 369/13 |
| 6,172,944 * | 1/2001 | Hatam-Tabrizi ............ 369/13 |
| 6,256,267 | 7/2001 | Hatam-Tabrizi . |

* cited by examiner

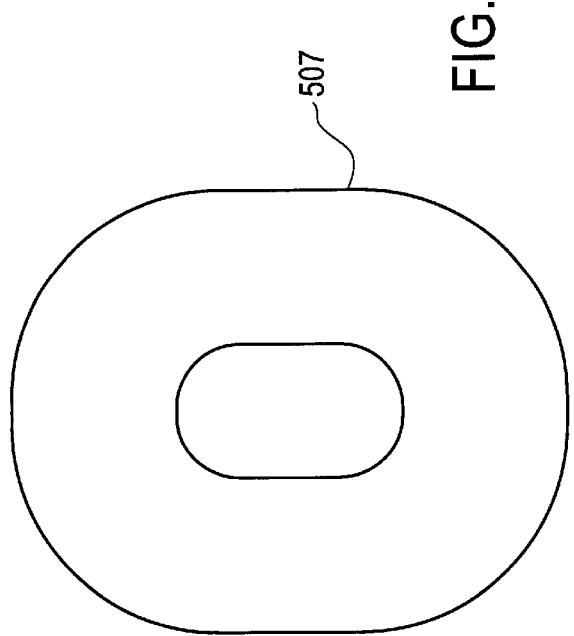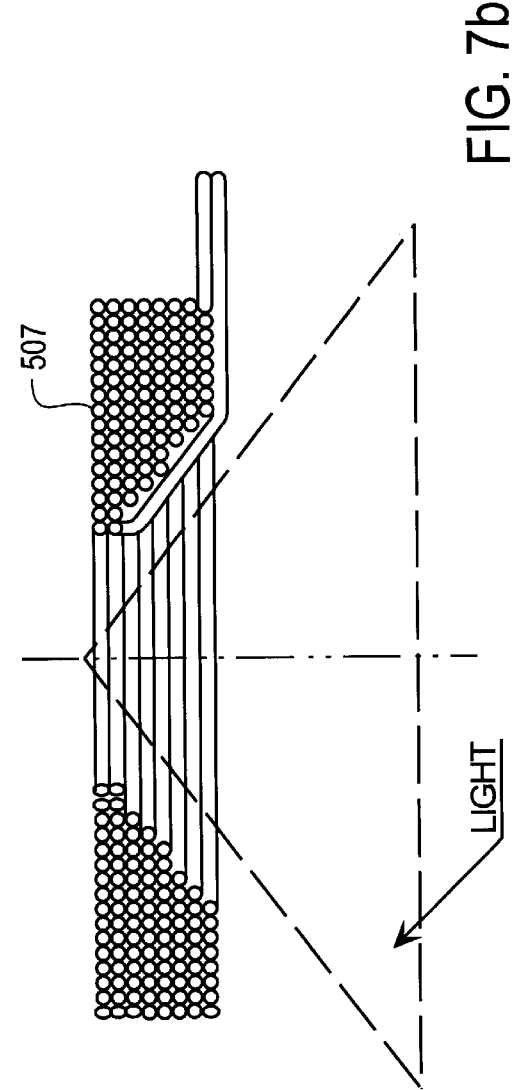

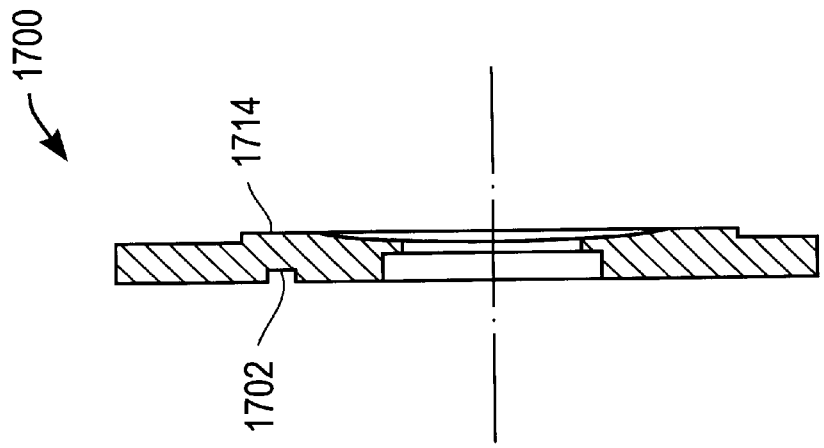
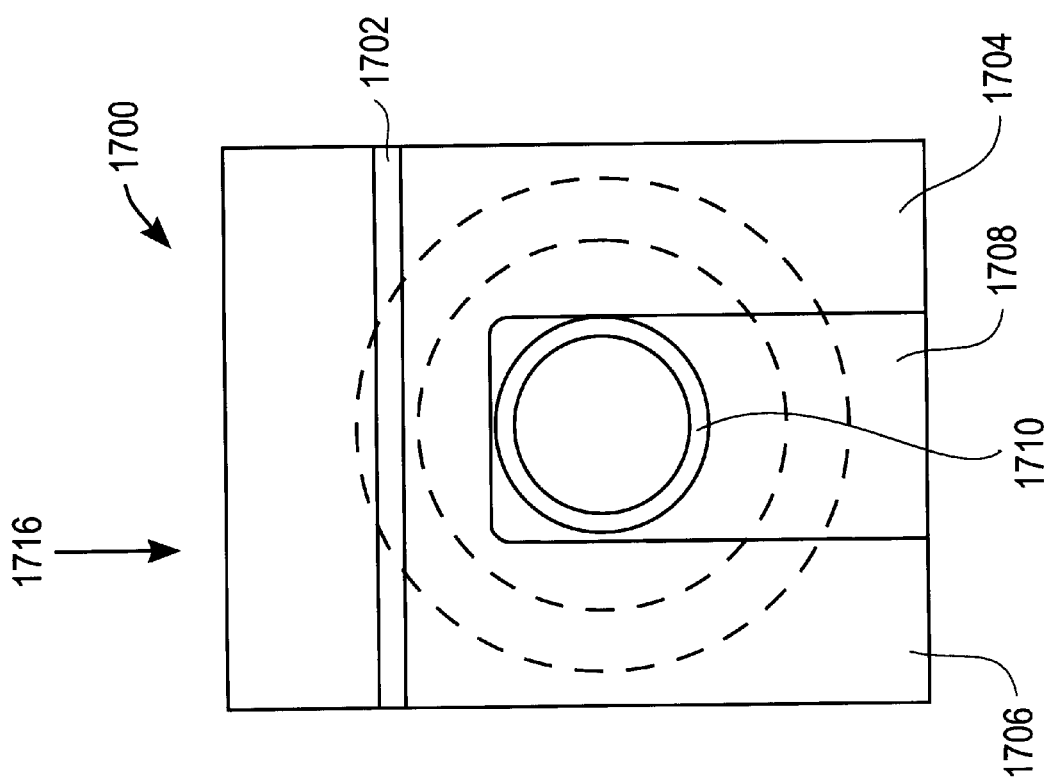

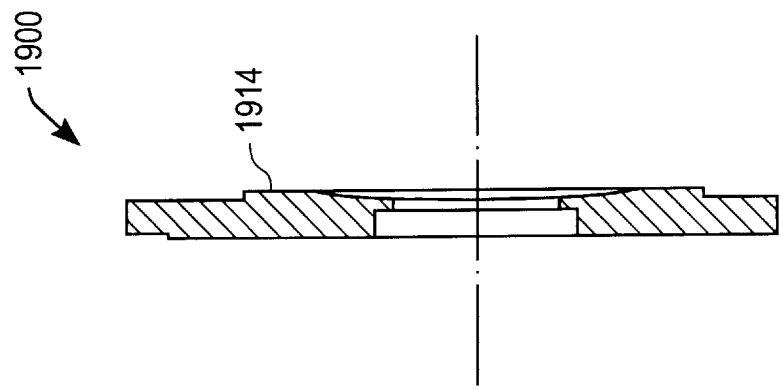
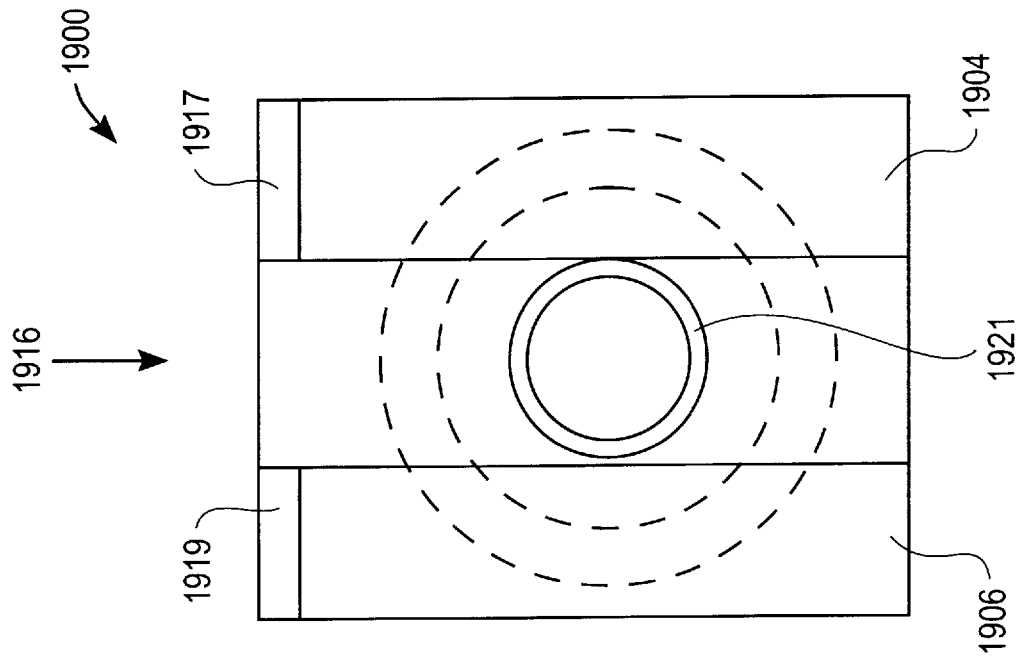

DISC DRIVE SUSPENSION AND HEAD

FIELD OF THE INVENTION

The present invention is in the field of disc drive mechanisms for reading data from and writing data to data storage discs. More particularly, the present invention is in the field of magneto-optical (MO) disc drives.

BACKGROUND OF THE INVENTION

Electronic data is commonly stored on discs of various types. Disc drives hold and rotate the disc while positioning a mechanism over the disc to read data from it or write data to it. Some conventional disc drives use a "flying" read/write head, or "flying head", to access data stored magnetically on circular or spiral grooves, or tracks, of the data storage disc. Engaging the flying head in a position to access data is referred to as loading the head. Typically, the flying head is positioned over a track at a certain height to allow data reading or data writing. For example, in magneto-optical (MO) disc drives, data is recorded by positioning a head that includes a magnetic coil in proximity to an MO disc, locally heating the MO disc to lower the coercivity of a layer of magnetic media. When the coercivity of the magnetic media is lowered, the magnetic head applies a magnetic field to reverse the magnetic polarity in the heated area recording data on the MO disc. In such MO disc drives, data is read from the magnetic media of the MO disc by illuminating areas of the MO disc with linearly polarized laser light. The Kerr rotation effect causes the plane of polarization of the illuminating laser beam to be rotated. The direction of rotation depends on the magnetic polarity in the illuminated area of the storage media. When the MO disc is read, the polarization rotation is determined with a pair of optical detectors in a polarization beam splitter to produce an output data signal.

In one prior art method, a flying head is in a loaded position on the MO disc when it is not spinning and no data access operation is taking place. For a data access operation, the MO disc is rotated so that an air bearing forms between the MO disc and the flying head. When the flying head is suspended above the MO disc by the air bearing, the flying head can be moved over the MO disc to an appropriate area to perform a data access operation. This technique is referred to as static loading and unloading or as contact-start-stop because the MO disc must be stationary when the head is loaded or unloaded. This technique has several disadvantages. One disadvantage is that part of the MO disc area must be set aside as a landing zone, which reduces the MO disc area available for data storage. Another disadvantage is that the head can crash into the MO disc if the drive is bumped or dropped, if power is suddenly removed from the drive, or if contaminants are on the disc surface at loading and become trapped under the head. When the head crashes into the MO disc, there is a likelihood of damage to the MO disc, loss of data stored on the MO disc, and even destruction of the drive itself.

Yet another disadvantage of prior art static loading/unloading systems is the necessity of providing a very smooth, very flat, slider surface and media surface on which to carry the magnetic head. Such a slider body is needed in static loading/unloading systems to withstand thousands of contact-start-stop events in the life of the disc drive. In addition, static loading/unloading systems also require lubrication and texturing of the media surface.

Another prior art method, called dynamic loading and unloading, loads and unloads the head while the MO disc is spinning. FIG. 1 is a diagram of a some parts of a prior art disc drive that performs dynamic loading and unloading. Suspension 103 is attached to flying head 109. Suspension 103 is typically manufactured of a material with spring characteristics and has a bend 105 created by forming the material of suspension 103. Bend 105 serves the purpose of providing a spring force and stiffness in the direction perpendicular to the surface of MO disc 107. Some other prior art suspensions may include multiple bends. The angle of bend required to produce the appropriate spring force required in a particular disc drive application must be calculated before forming suspension 103. Because the forming process is imprecise, some trial and error may be required to produce a suspension having the required spring force. Typically, the gram load of the suspension is measured after the suspension if formed.

Flying head 109 is loaded by moving suspension 103 over ramp 101. The surface of ramp 101 over which suspension 103 moves has a slope such that suspension 103 and flying head 109 are moved over MO disc at the proper height for read or write operations. When suspension 103 is advanced toward disc 107, suspension 103 is flexed such that the angle of bend 105 is opened.

FIG. 2 is a side view of suspension 103 and flying head 109 showing bend 105. Mounting plate 111 is attached to suspension 103 and to mounting area 113. Actuator arm 113 is a rigid part of the disc drive assembly. Plane 115 is the plane of an MO disc drive in the disc drive assembly incorporating suspension 103. When head 109 is loaded, suspension 103 is flexed, for example by ramp loading as in FIG. 1, so that the surface of head 109 is approximately parallel to plane 115.

Disadvantages of prior art suspension systems include the time and expense required to form a bend in the suspension and test the suspension to confirm that it has the appropriate spring force.

SUMMARY OF THE INVENTION

A magneto-optical (MO) disc drive including a novel suspension, slider body, airbearing surface, and magnetic head is described. The MO disc drive includes a fine-focus actuator block including an objective lens, wherein the coarse carriage block moves radially above a surface of an MO disc to position the objective lens. The MO disc drive also includes a flat suspension having a first end and a second end, wherein the first end is fixedly attached to the fine-focus actuator block and the second end is attached to the coarse carriage block. A gimbal is moveably attached to an opening in a surface of the suspension and a magnetic head assembly is attached to the gimbal. The magnetic head assembly is loaded and unloaded by the load/unload mechanism independent of the objective lens and attached to the coarse actuator.

BRIEF DESCRIPTION OF THE DRAWINGS

FIG. 7a is a top view of a magnetic write coil.

FIG. 7b is a cross-section view of a magnetic write coil.

FIG. 11b is a cross-sectional view of the slider body and airbearing surface of FIG. 11a.

FIG. 12b is a cross-sectional view of the slider body and airbearing surface of FIG. 12a.

FIG. 13b is a cross-sectional view of the slider body and airbearing surface of FIG. 13a.

FIG. 14b is a cross-sectional view of the slider body and airbearing surface of FIG. 14a.

FIG. 15a is diagram of one embodiment of a slider body and airbearing surface.

FIG. 15b is a cross-sectional view of the slider body and airbearing surface of FIG. 15a.

FIG. 16b is a cross-sectional view of the slider body and airbearing surface of FIG. 16a.

FIG. 17a is diagram of one embodiment of a slider body and airbearing surface.

FIG. 17b is a cross-sectional view of the slider body and airbearing surface of FIG. 17a.

FIG. 18b is a cross-sectional view of the slider body and airbearing surface of FIG. 18a.

FIG. 19a is diagram of one embodiment of a slider body and airbearing surface.

FIG. 19b is a cross-sectional view of the slider body and airbearing surface of FIG. 19a.

FIG. 20b is a cross-sectional view of the slider body and airbearing surface of FIG. 20a.

DETAILED DESCRIPTION OF THE PRESENT INVENTION

The present invention includes a disc drive with a novel magnetic head and an intelligent load/unload mechanism. In one embodiment, the present invention includes a magneto-optical (MO) disc drive for reading from and writing to a magneto-optical MO disc. The present invention may be used with a magneto-optical recording apparatus and method as described in co-pending U.S. patent application Ser. Nos. 09/027,420 and 09/026,798, both entitled Method and Apparatus for Reading and Writing Magneto-Optical Media, which are assigned to the Assignee of the present patent application.

Figure 1:
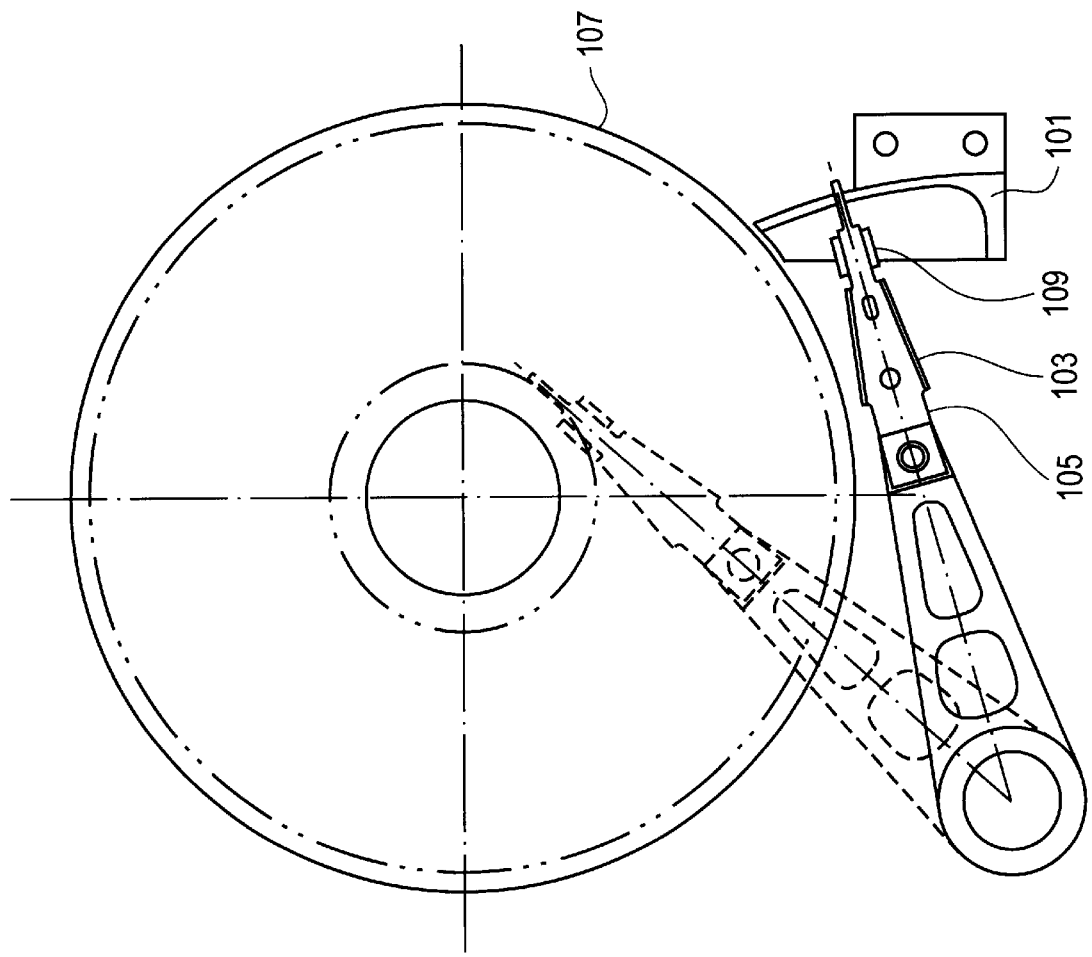
FIG. 1 is a diagram of a prior art ramp loading mechanism.
Figure 2:
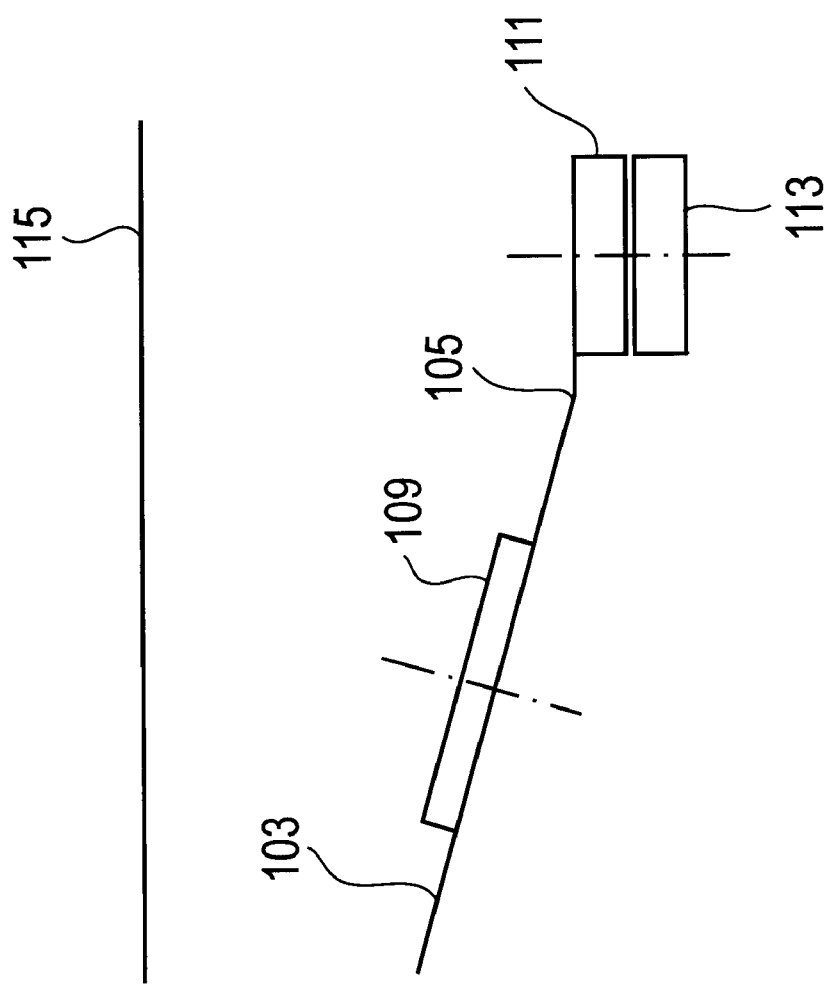
FIG. 2 is a diagram of a prior art magnetic head suspension assembly.
Figure 3:
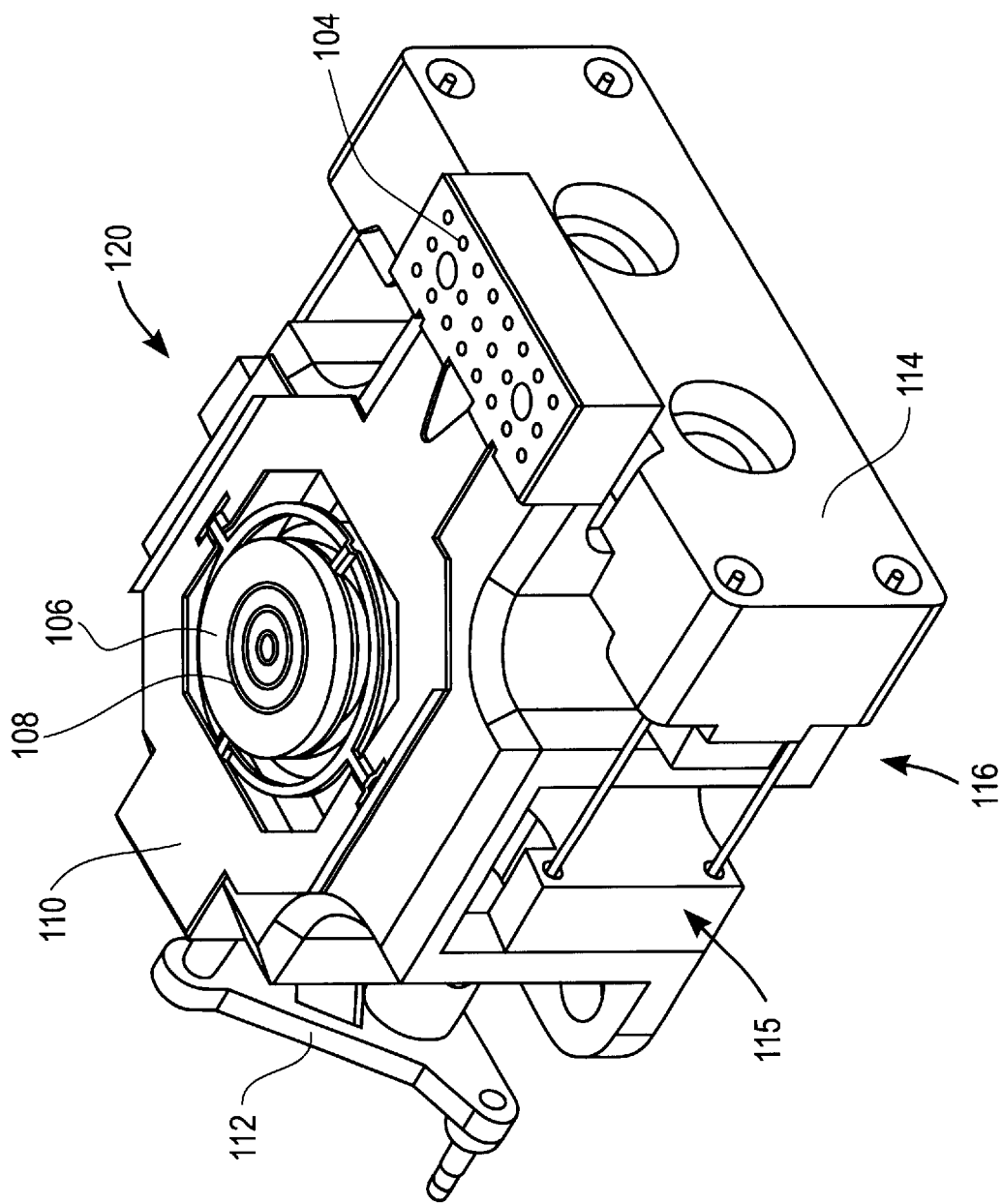
FIG. 3 is a diagram of one embodiment of a head/suspension/fine-focus actuator assembly.

FIG. 3 is a diagram of fine-focus actuator block 114 and magnetic head suspension assembly 110 according to one embodiment. In the embodiments described, the reading and recording technique used is a magneto-optical technique. Embodiments of the present invention could, however, be used with other recording techniques. Fine-focus actuator block 114 is attached to a coarse carriage (not shown). Fine-focus actuator block 114 includes a fine actuator, a focus actuator and an objective lens in its interior 115. The objective lens focuses laser light that travels in the direction of arrow 116 toward an MO disc (not shown) while a read or write operation to the MO disc takes place. The focus actuator moves the objective lens in the direction 116 to maintain focus. The fine actuator moves the objective lens in the direction 120 to maintain fine positioning. When an MO disc is in place, it rotates in the a plane parallel to the surface of slider body 106 and fine-focus actuator block 114 (along with a coarse actuator which is not shown) moves laterally, as shown by arrow 120, in order to position the objective lens and flying slider body 106 above an appropriate area of the MO disc. Suspension 110 includes mounting plate 104 that is bonded or screwed to fine-focus actuator block 114. Suspension arm 110 is made of a flexible material such as stainless steel or copper, and the end of suspension arm 110 that is opposite mounting plate 104 is free to be moved up and down by load/unload mechanism 112. Load/unload mechanism 112 is explained more fully below. Suspension 110 holds a flying magnetic head that includes slider body 106 and magnetic coil 108. Magnetic coil 108 and slider body 106 face an MO disc in a completely assembled MO disc drive. When suspension 110 is not in contact with load/unload mechanism 112, suspension arm 110 is in a loaded position with respect to an MO disc. In one embodiment, as shown in FIG. 3, magnetic coil 108 forms a light channel through which laser light passes to an MO disc from an objective lens in fine-focus actuator body 115. Fine-focus actuator body 115 includes a fine actuator for fine tracking and a focus actuator for focusing laser light through the objective lens after fine-focus actuator block 114 is moved over a track by the coarse carriage. The fine actuator moves radially with respect to the MO disc and the focus actuator moves perpendicularly with respect to the MO disc. The objective lens is attached to the fine and focus actuators and is decoupled from the magnetic head assembly attached to suspension 110.

Figure 4:
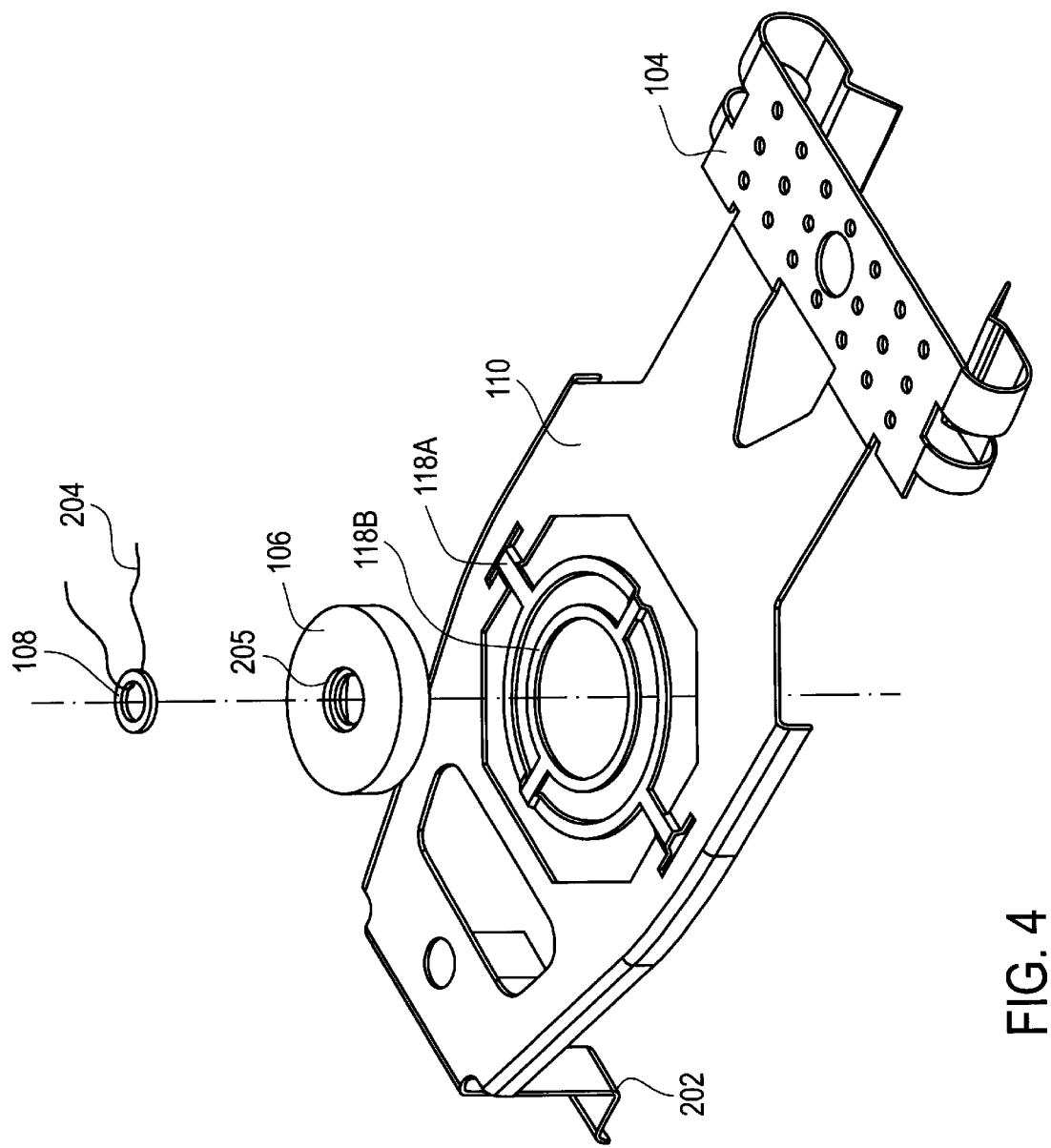
FIG. 4 is a diagram of one embodiment of a magnetic head suspension assembly.

FIG. 4 is a diagram showing an embodiment of a suspension. Suspension 110 is shown with mounting plate 104 and tab portion 202. Tab portion 202 contacts load/unload mechanism 112 during unload operations. Gimbal area 118 is shown with outer gimbal portion 118A (for enabling slider pitch) and inner gimbal portion 118B (for enabling slider pitch). Gimbal area portions 118A and 118B each pivot about an axis that is parallel to the surface of an MO disc in the assembled disc drive. In the embodiment shown, gimbal assembly 118 is circular, but in other embodiments, the gimbal assembly could have other shapes, such as a rectangular shape. The axes of rotation of gimbal portions 118A and 118B are perpendicular to each other. The inner radius of gimbal portion 118B receives slider body 106. Slider body 106 includes a flange portion (not shown) that is sized to fit into gimbal portion 118B, making slider body 106 and gimbal assembly 118 self-aligning. This arrangement makes assembly easier and more efficient as compared to the prior art. In prior art assemblies, a magnetic head assembly such as is formed by slider body 106 and magnetic coil 108 is bonded to a flat surface of a gimbal assembly. In such prior art arrangements, alignment and/or measurement is necessary before bonding the gimbal assembly to the magnetic head assembly in order to match the x and y axes of the gimbal assembly to those of the magnetic head assembly.

Slider body 106 includes a step 205 in its inner radius. Step 205 receives magnetic coil 108, which is bonded to the flat surface of step 205. In one embodiment the inner diameter of magnetic coil 108 forms the inner diameter of the assembly of magnetic coil 108 and slider body 106. This inner diameter defines a channel for laser light. In one embodiment, the inner diameter of magnetic coil 108 is approximately 0.16 mm. Wire 204 is a magnetic coil that in one embodiment has approximately 25 turns. Wire 204 is made of any material typically used for such a purpose such as copper or aluminum wire. In one embodiment, magnetic coil 108 has a relatively fast current rise time of less than three nanoseconds.

The assembly formed by magnetic coil 108, slider body 106, suspension 110 is more easily assembled to the fine-focus actuator block than suspension arms of the prior art. Prior art suspension arms are typically screwed or swaged to the appropriate part of the disc drive. In the present invention, clip portion 104 of suspension arm 110 snaps onto coarse carriage block 114 and is retained thereon by spring tension.

Figure 5:
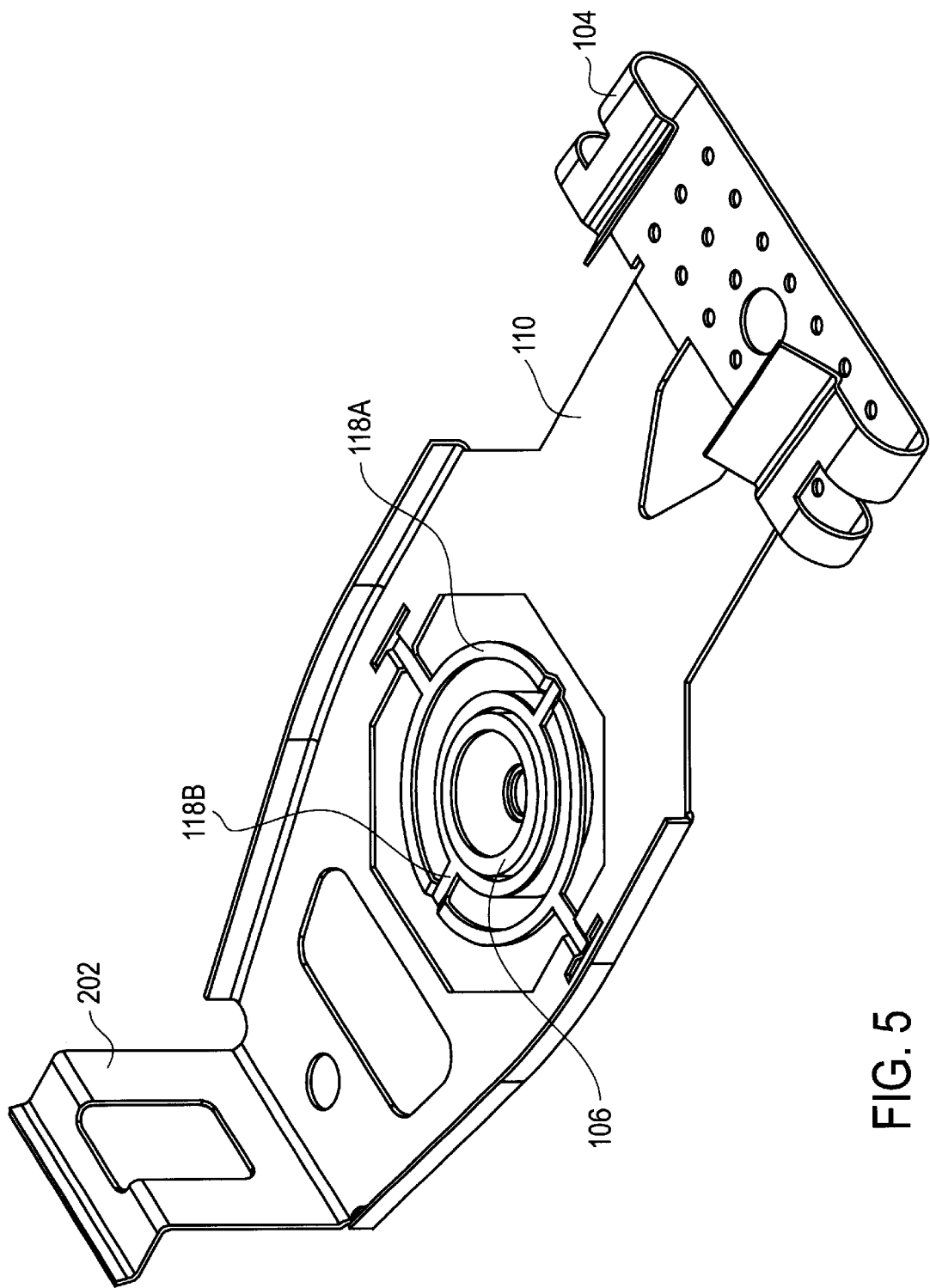
FIG. 5 is a diagram of another embodiment of a magnetic head suspension assembly.

FIG. 5 is a diagram of suspension 110 as assembled. FIG. 5 shows the side of suspension 110 and its connected components that face away from an MO disc in an assembled drive. FIG. 5 shows gimbal assembly portion 118A, as well as slider body 106 seated in gimbal portion 118B.

Figure 6:
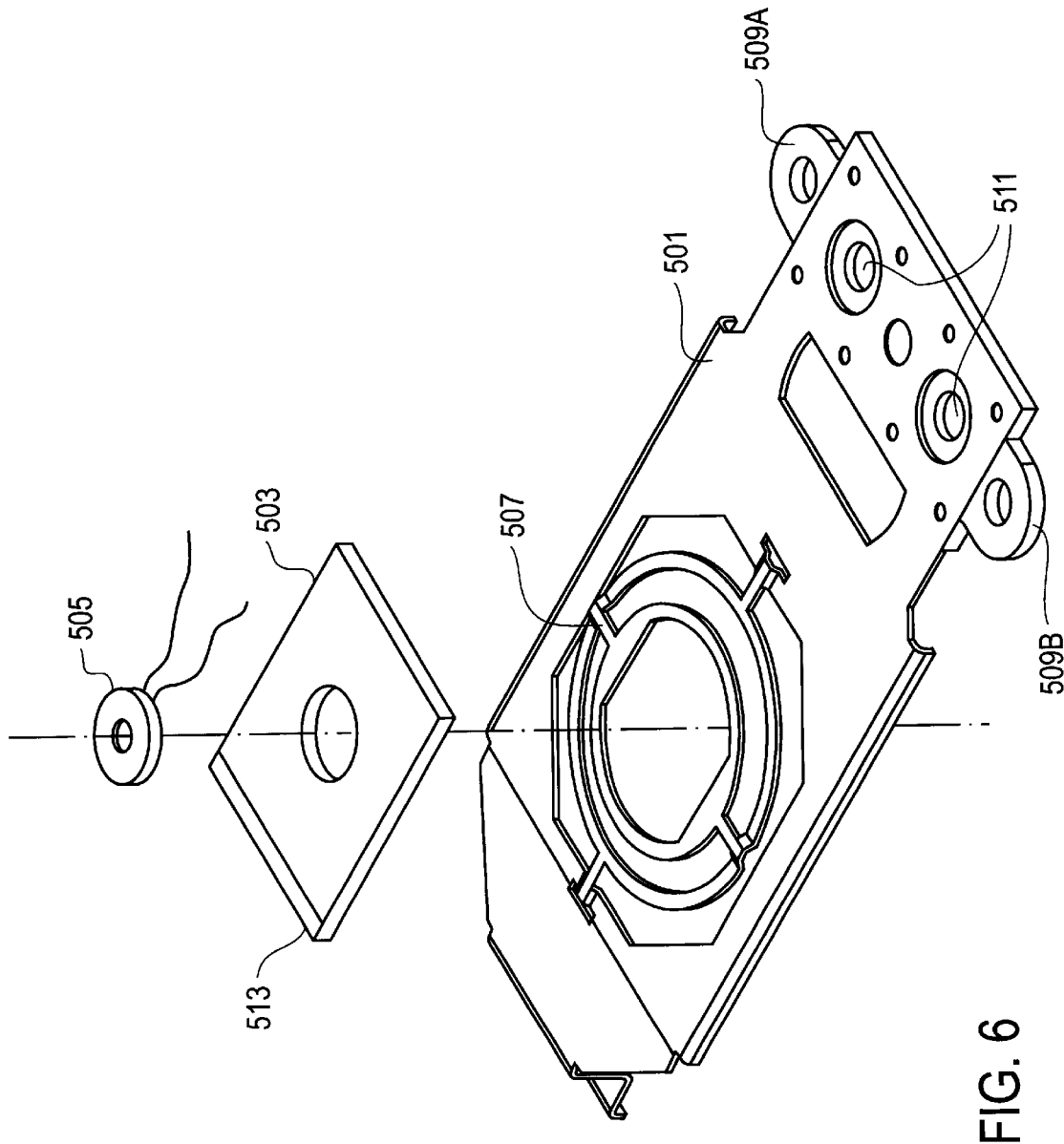
FIG. 6 is a diagram of another embodiment of a magnetic head suspension assembly.

FIG. 6 is a diagram of another embodiment of a suspension and magnetic head (as also shown in FIG. 3). Suspension 501 includes gimbal assembly 507, which has an opening to accommodate magnetic head 503. Magnetic head 503 is rectangular and includes leading edge chamfer, or ramp 513 for forming an air bearing when an MO disc spins in proximity to magnetic head 503. Coil 505 seats in the opening of magnetic head 503.

Suspension 501 attaches to a disc drive assembly through screws or bolts in holes 511. Ears 509 may be used to align suspension 501 with the disc drive so that laser light may travel through the opening in coil 505 as required during read and write operations.

FIG. 7a is a top view of an embodiment of a coil 507. The oval shape of coil 507 results in lower inductance. FIG. 7b is a cross-section view of coil 507. Coil 507 is wound to form a conical cross-section as shown. Laser light enters coil 507 through the wider part of the opening formed by the windings of coil 507. As electric current travels through coil 507, magnetic flux is induced in the center of coil 507 in a direction that is perpendicular to the surface of an MO disc. Because the cross-section of coil 507 is conical in cross-section rather annular, as in the typical prior art, the windings of the coil are closer to the focal point of the laser light than in prior art systems. This results in increase in the amount of flux produced for amount of inductance or the amount of clearance between the laser light and the coil. The wire is approximately 56 gage wire and the wire has approximately 25 turns.

Figure 8B:
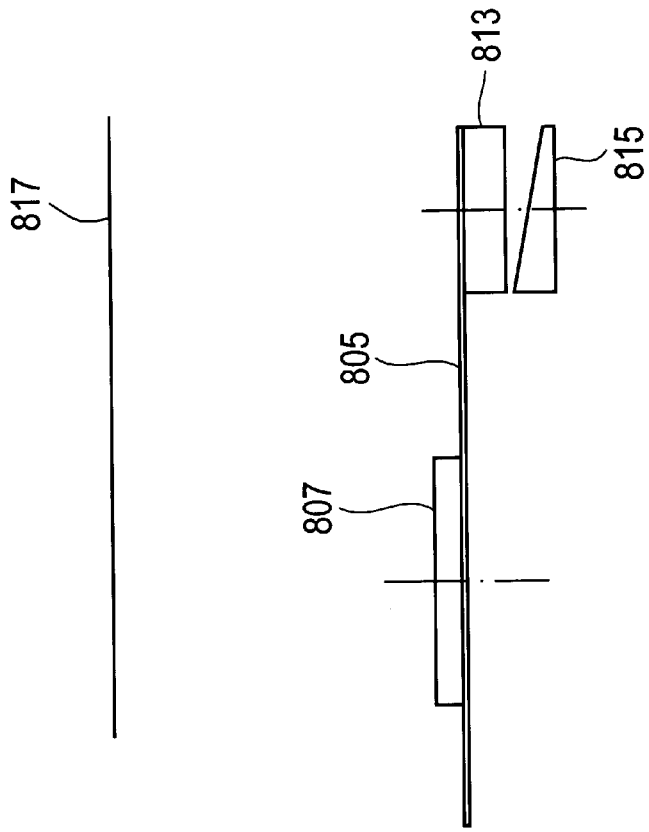
FIG. 8b is a diagram of another embodiment of a magnetic head and suspension assembly.
Figure 8A:
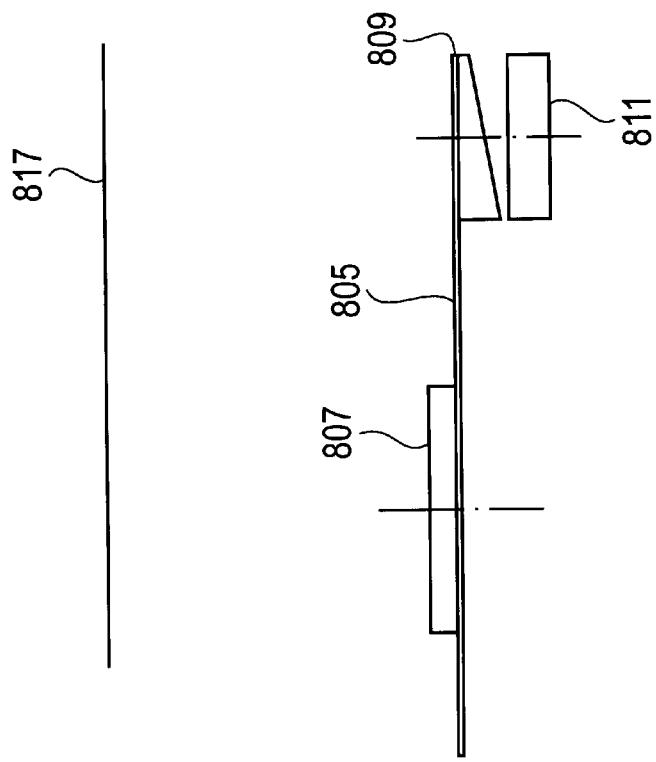
FIG. 8a is a diagram of an embodiment of a suspension.

FIG. 8a is a diagram of one embodiment of suspension. Suspension 805 is one flat piece of material. Magnetic head 807 may be any of the embodiments described herein. When assembled in a disc drive, mounting plate 809 is attached to mounting area 811 of the disc drive so that the facing surfaces of mounting plate 809 and mounting area 811 are in rigidly held in contact. When assembled, suspension 805 forms an angle with plane 817 and a gram load is generated. Therefore, the present invention provides for gram load generation without the requirement of pre-forming the suspension and testing for proper spring force as in the prior art.

The angle of mounting plate 809 is calculated from the required spring force. For example, known computer programs that perform finite element analysis may be used for this purpose. Once the angle is determined, however, the spring force, or stiffness in the direction vertical plane 817 is guaranteed by design. This is in contrast to the prior art, wherein even after bend locations and angles for the suspension have been determined and tested, variances introduced by the forming process and possibly by material make further process verification testing necessary.

FIG. 8b is a diagram of another embodiment of a suspension. Suspension 805 as in FIG. 8a is shown. The angle between suspension 805 and plane 817 is formed, in this embodiment, by mounting plate 813 is attached to angled mounting area 815 of the disc drive.

Figure 9:
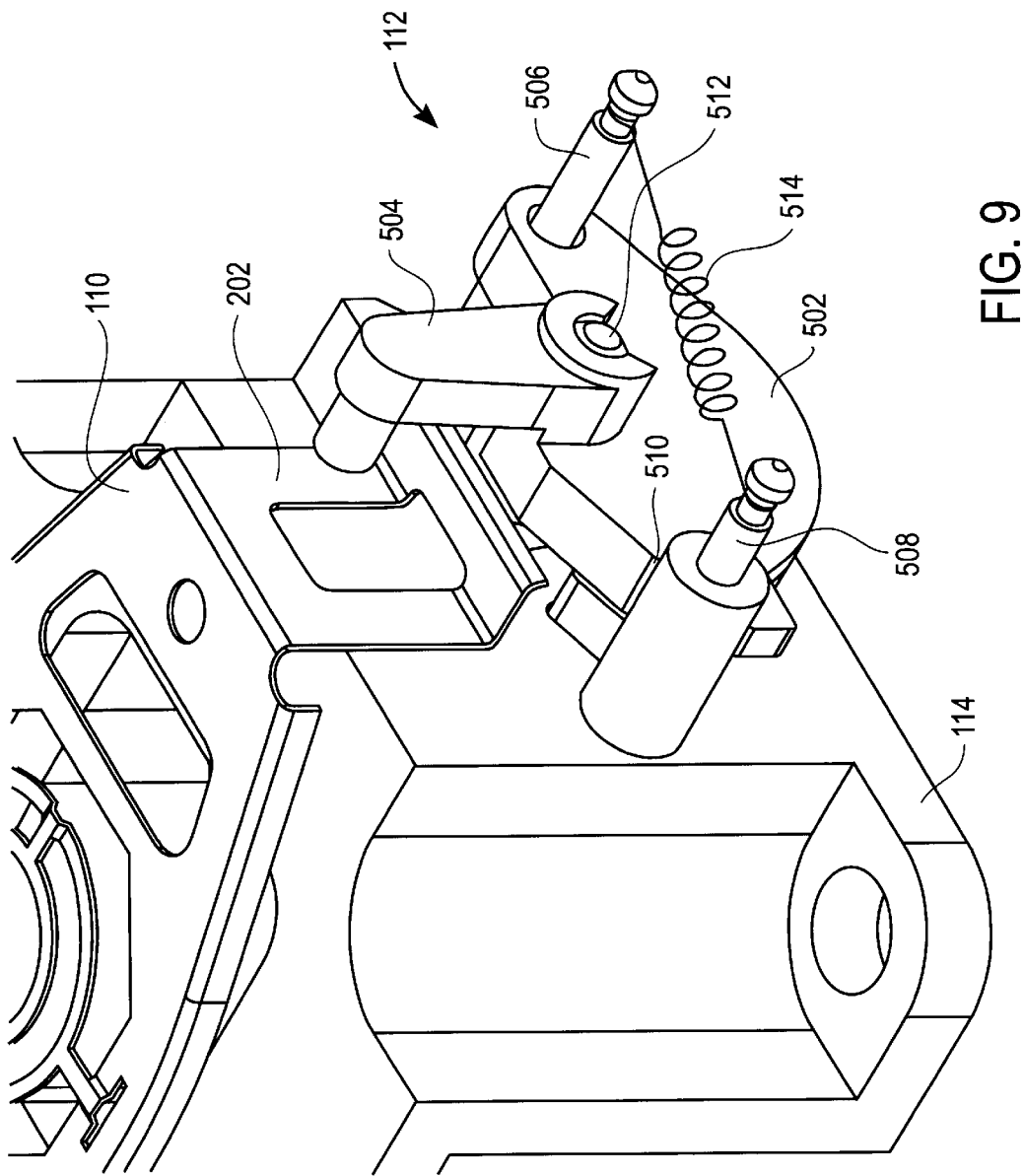
FIG. 9 is a diagram of one embodiment of a load/unload mechanism in a position required to load a magnetic head.

FIG. 9 is a diagram of load/unload mechanism 112 showing suspension 110 in a loaded position. Load/unload mechanism 112 is mounted on fine focus actuator block 114. Arm and engagement pin mechanism 504 rotates about a stationary pin. When arm and engagement pin assembly 504 rotate and contact tab 202, suspension arm 110 is pulled away from a magneto-optical disc, and the flying magnetic head seated in suspension 110 is unloaded. When engagement arm and pin assembly 504 is not in contact with tab 202, the flying magnetic head is free to fly above the MO disc at a height appropriate for write operations. Load/unload mechanism 112 is actuated by a rotary moving coil and fixed magnet actuator. In other embodiments, the actuator may be a rotary moving magnet and fixed coil actuator.

The operation of load/unload mechanism 112, as well as the rest of the disc drive in which the assembly resides is controlled by a microprocessor in the disc drive. Load/unload mechanism 112 includes anchor pin 508 and moving pin 506. Moving pin 506 and anchor pin 508 and fixed pin 512 are connected by spring 514. When the flying magnetic head is loaded or unloaded, torque is applied to plate 502, which overcomes the retaining torque supplied by spring 514 so that arm and engagement pin 504, moving pin 506 and plate 502 rotate. In the position shown, the flying magnetic head is loaded and the retaining torque supplied by spring force of spring 514 maintains load/unload mechanism 112 in the position shown. When it is required to unload the flying magnetic head, torque applied to plate 502 rotates moving pin 506, engagement pin 504 and plate 502 clockwise such that the spring force of spring 514 is overcome and plate 502 rests against stops (not shown) and is held in place by spring force of spring 514. Once in the unloaded position, spring force of spring 514 retains the assembly in the new, unloaded position. Because spring force is used to maintain load/unload mechanism 112 in either the loaded or unloaded position it is not necessary to use electrical energy to maintain the magnetic head in either the loaded or unloaded position.

The present invention has the significant advantage of loading or unloading the flying magnetic head to or from any position on a disc. The microprocessor of the disc drive controls operations of load/unload mechanism 112 such that under fault conditions, the flying magnetic head is unloaded regardless of position on the disc. Such fault conditions include sudden loss of power to the drive or significant contaminants on the disc surface. When main power to the drive is suddenly interrupted, capacitively stored power is used to unload the flying magnetic head. In another embodiment, the spindle motor turning the MO disc has sufficient back electromagnetic force (EMF) to unload the flying magnetic head before the disc stops spinning. With the present invention, the danger of the magnetic head physically crashing into the disc is virtually eliminated. In addition, in contrast to contact-stop-start methods of loading and unloading it is not necessary to dedicate an area of the disc as a landing zone. For this reason, the entire disc can be used for data storage and overall data storage density is increased. Additionally, contact-start-stop requires lubrication on the disc surface. Lubrication is expensive and evaporates over time.

In the present invention, the objective lens (covered by fine-focus actuator block 114) is decoupled from the flying magnetic head that is mounted in gimbal assembly 118. Because the magnetic head is used only for writing, it is possible to scan the disc using only the objective lens without loading the magnetic head. This has the advantage of allowing a scan of pre-embossed information before performing a load of head, thereby eliminating the possibility of crashing the head onto the drive when the disc is of a wrong type or the disc is contaminated such that it is not possible to read pre-embossed information on the disc. The pre-scan of pre-embossed information should indicate such problems and prevent loading of the magnetic head under potentially hazardous conditions.

Figure 10:
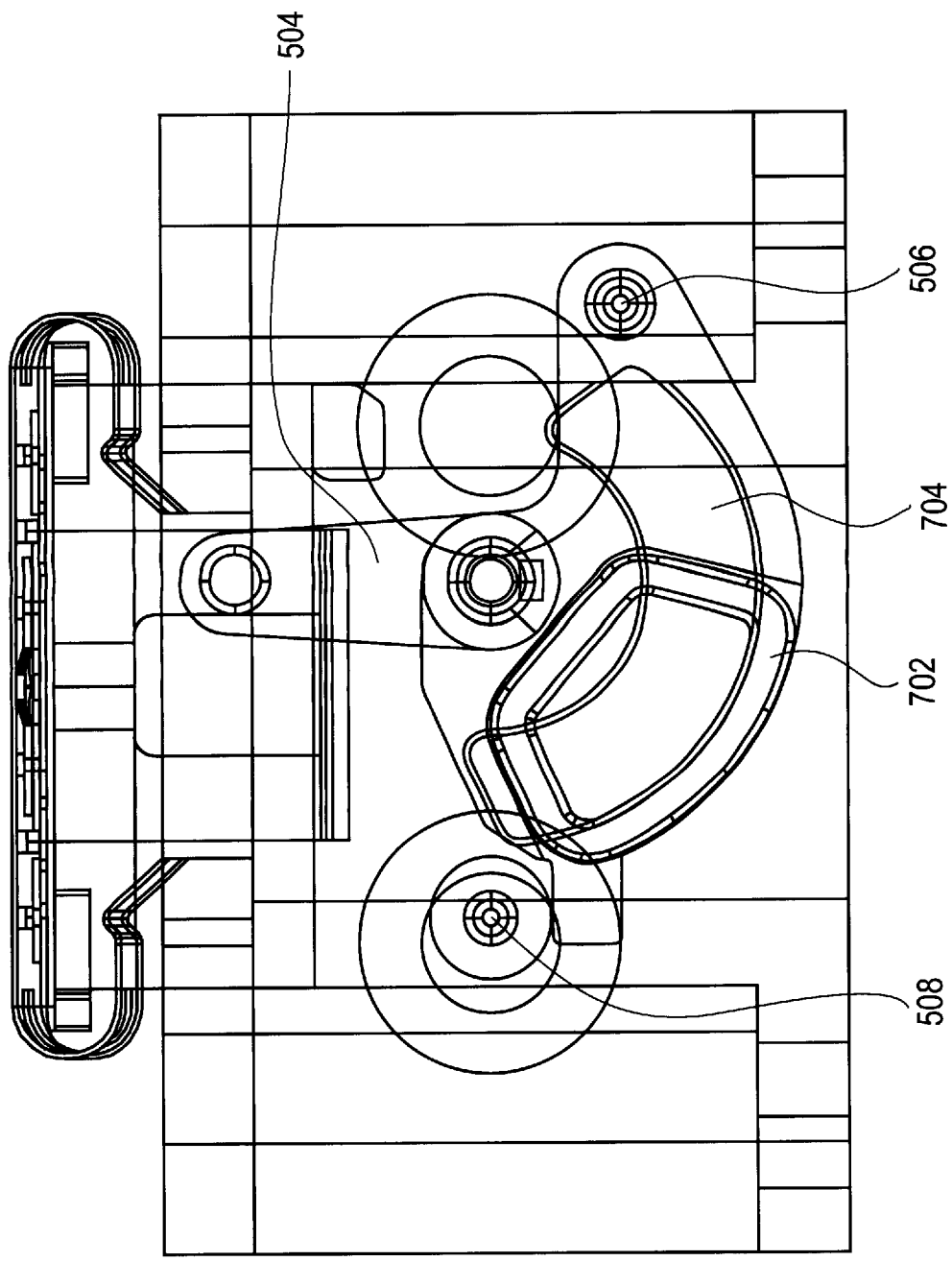
FIG. 10 is a more detailed diagram of one embodiment of a load/unload mechanism.

FIG. 10 is a diagram of elements beneath plate 502 of load/unload mechanism 112. FIG. 10 shows arm and engagement pin 504, moving pin 506, anchor pin 508, moving coil 702, and fixed magnet 704.

Figure 11B:
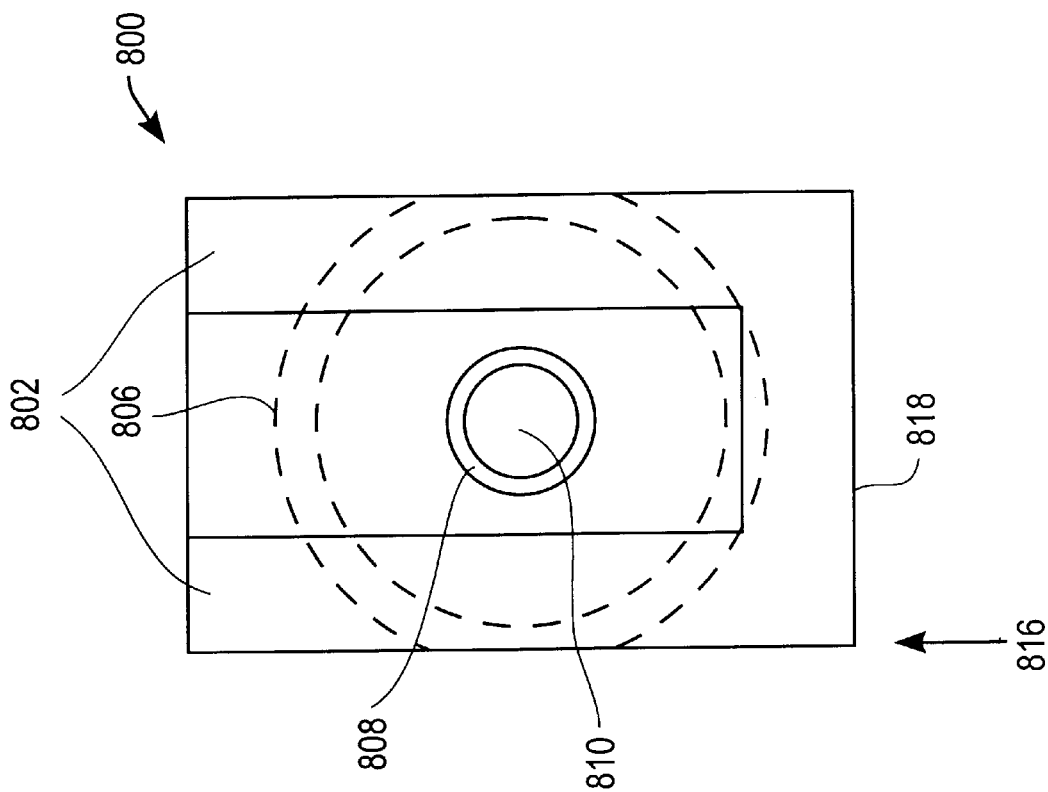

FIG. 11*b* is a top view of an embodiment of a slider body of a magnetic head. Slider body 800 is an alternative embodiment to the embodiment of slider body 106. Slider body 800 is rectangular in shape, and is approximately 5.5 mm long and approximately 3.5 mm wide. FIG. 11*b* shows the surface of slider body 800 that faces an MO disc. Slider body 800 includes a raised positive pressure airbearing surface in peripheral area 802 and recessed relieved pressure central area 806. Raised peripheral area is approximately one mm in width. When a disc is spinning over slider body 800 air travels, in the direction shown by arrow 816. As air strikes leading edge 818, loose surface contaminants are knocked off of the MO disc before the MO disc passes under slider body 800. This is in contrast to typical prior art flying magnetic heads in which the slider body includes a leading edge ramp, which is required to generate pressure in a contact-start-stop application. It is not necessary in the present invention to have a leading edge ramp, because even when the head is unloaded and the disc is not spinning, slider body 800 never contacts the disc. In this embodiment, slider 800 has a light channel 810 through the entire body. Additionally, the airbearing surface 802 is not connected across edge 818. Step 808 in light channel 810 provides a bonding seat for a magnetic coil inserted in slider body 800. The magnetic coil surface is coplanar with air bearing surface 802.

Figure 11A:
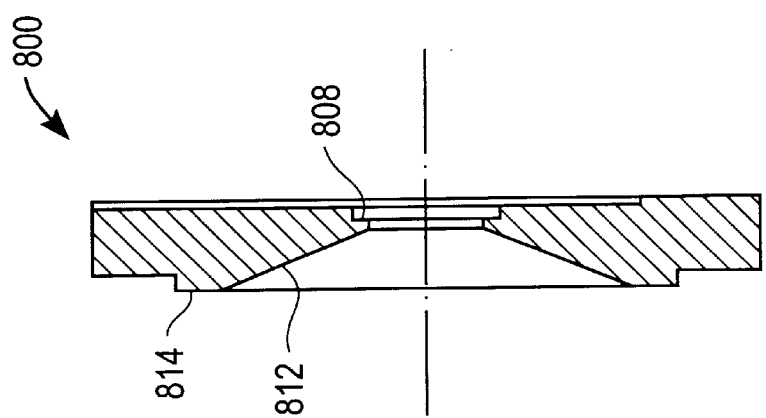
FIG. 11a is diagram of one embodiment of a slider body and airbearing surface.

FIG. 11*a* is a cross-section of slider body 800. The cross-section shows seat 808 for bonding a magnetic coil. The cross-section also shows flange 814, which is sized to fit into a circular gimbal assembly such as gimbal assembly 118. In this embodiment, bevel 812 connects flange 814 with seat 808 adjacent to light channel 810.

Figure 12B:
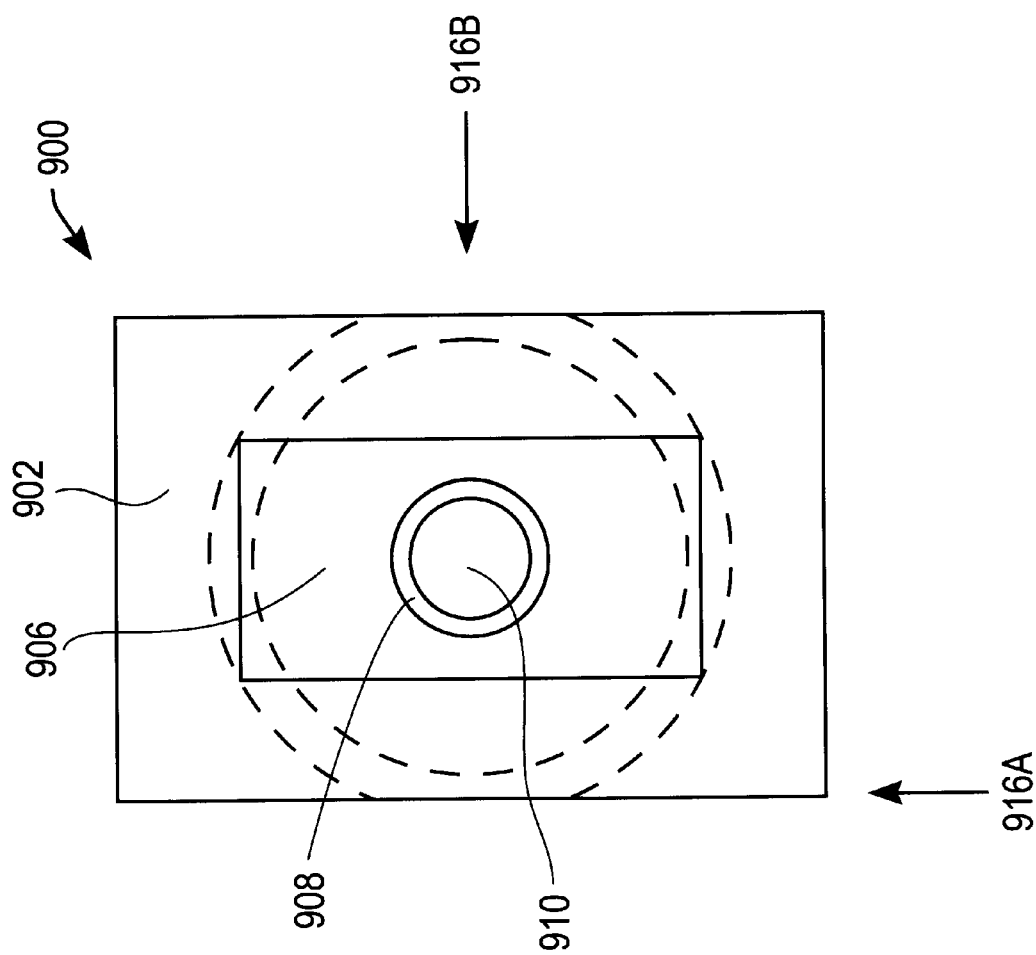

FIG. 12*b* is a diagram of another alternative embodiment of a slider body. Slider body 900 is rectangular in shape, and of approximately the same dimensions as slider body 800. Slider body 900 includes pressure relieved central recessed area 906. Slider body 900 also includes a raised positive pressure peripheral area 902 around the entire perimeter of slider body 900. The width of raised peripheral area 902 is approximately one mm. Slider body 900 includes light channel 910 therethrough, and step 908. Step 908 forms the inner diameter of light channel 910 and provides a bonding ledge for a magnetic coil. In some embodiments, air may travel in the direction of arrow 916*a* when slider body 900 is in operation. In other embodiments, air may travel in a direction indicated by 916*b* when slider body 900 is in operation.

Figure 12A:
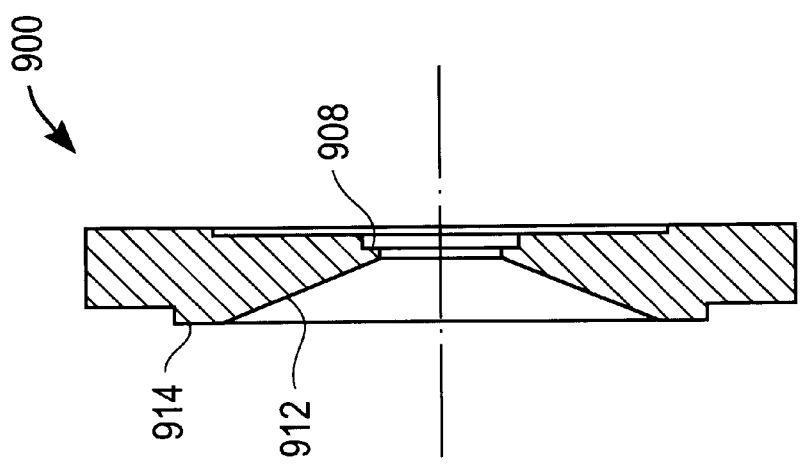
FIG. 12a is diagram of one embodiment of a slider body and airbearing surface.

FIG. 12*a* is a cross-sectional view of slider body 900 showing flange 912, step 908, and bevel 912.

Figure 13A:
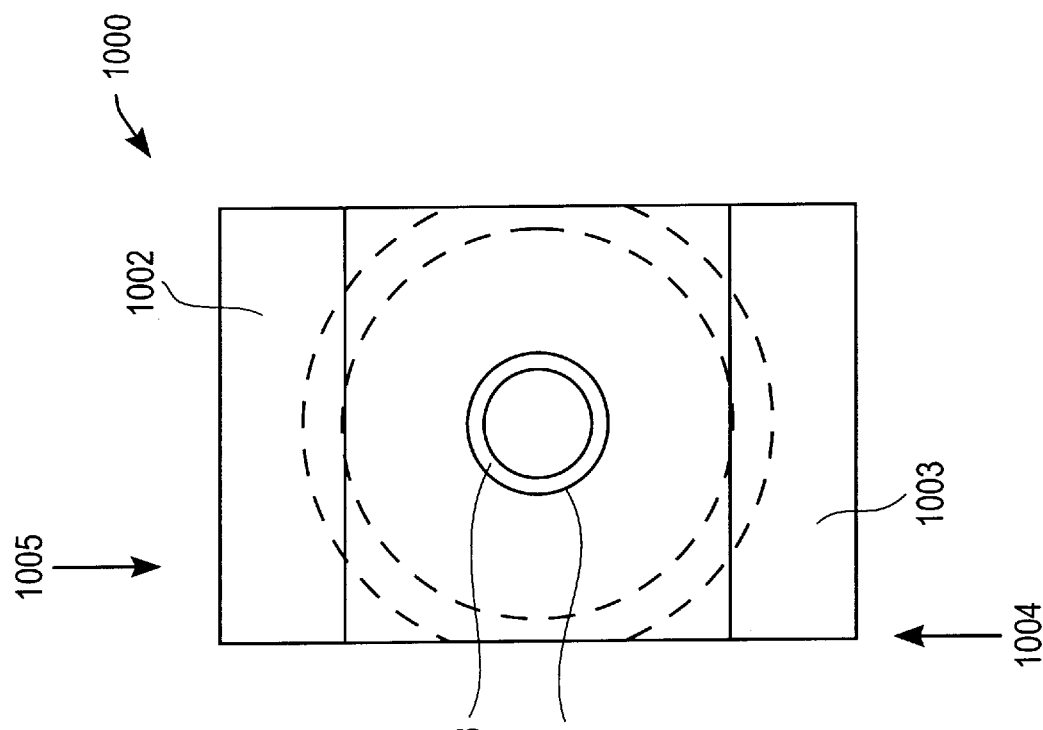
FIG. 13a is diagram of one embodiment of a slider body and airbearing surface.

FIG. 13*a* shows another embodiment of a slider body. Slider body 1000 includes light channel 1010, step 1008 in write channel 1010, and raised positive pressure airbearing surfaces 1002 and 1003. Raised surfaces 1002 and 1003 are approximately one mm wide. The diameter of light channel 1010 is approximately one mm. The width of step 1008 is approximately 0.2 mm. In one embodiment, air flows in the direction of arrow 1004 when slider body 1000 is in operation. In another embodiment, air flows in the direction of arrow 1005 when slider body 1000 is in operation.

Figure 13B:
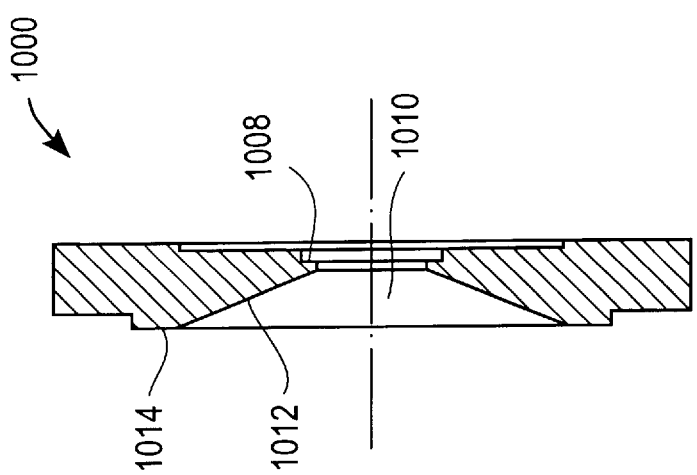

FIG. 13*b* is a cross-sectional view of slider body 1000. FIG. 13*b* shows light channel 1010, step 1008, flange 1014, and bevel 1012.

Figure 14A:
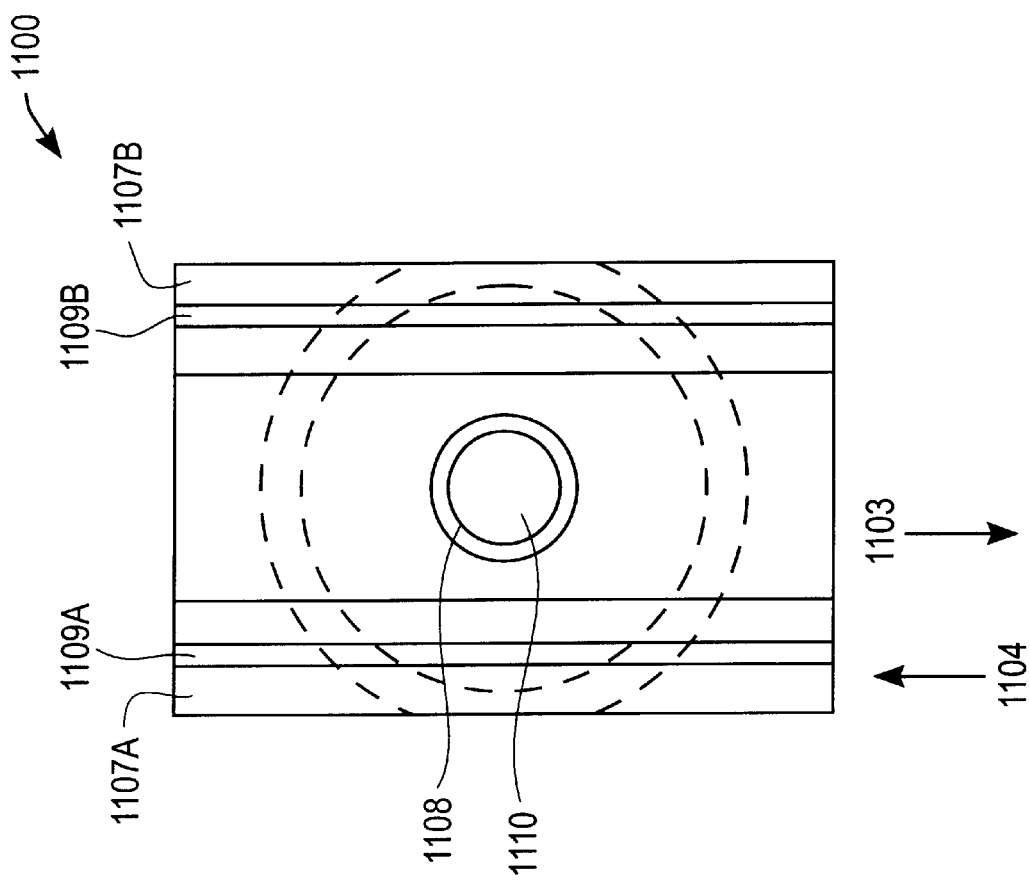
FIG. 14a is diagram of one embodiment of a slider body and airbearing surface.

FIG. 14*a* shows another embodiment of a slider body. Slider body 1100 includes positive pressure raised areas 1107*a* and 1107*b*. In operation, air flows over slider body 1100 in either the direction of arrow 1104 or the direction of arrow 1103. Light channel 1110 and step 1108 are shown in slider body 1100. Slider body 1100 includes pressure relief grooves 1109*a* and 1109*b*. Pressure relief grooves 1109, in one embodiment, are 0.05 to 0.5 mm deep and trap loose surface contaminants on the surface of a rotating disc when slider body 1100 is operational. Other embodiments of slider bodies shown including those shown in FIGS. 8, 9 and 10 may also include similar pressure relief grooves parallel to the direction of air flow.

Figure 14B:
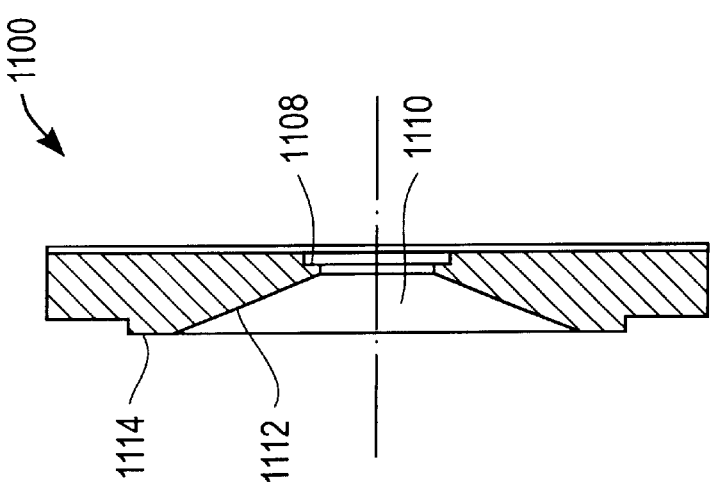

FIG. 14*b* is a cross-sectional view of slider body 1100. FIG. 14*b* shows step 1108, light channel 1110, flange 1114, and bevel 1112.

Figures 15A, 15B:
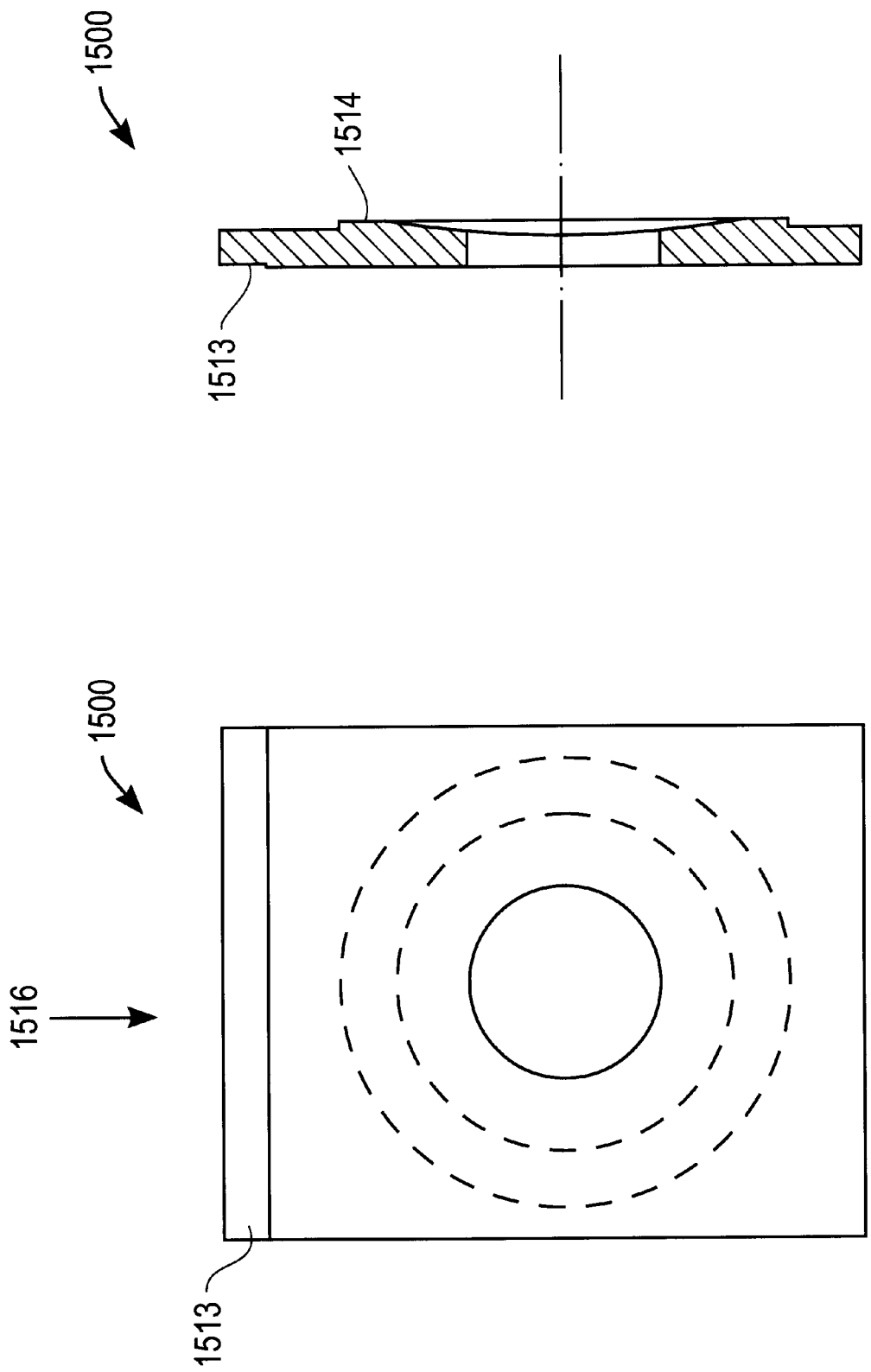

FIG. 15*a* is an embodiment of a slider body 1500 that include a leading edge ramp 1513. Leading edge ramp 1513 has a taper of approximately one degree and assists in forming an air bearing when air flows over the surface of slider body 1500 in the direction shown by arrow 1516. FIG. 15*b* is a cross-sectional view of slider body 1500 showing flange 1514 that provides for alignment of slider body with a suspension.

Figure 16A:
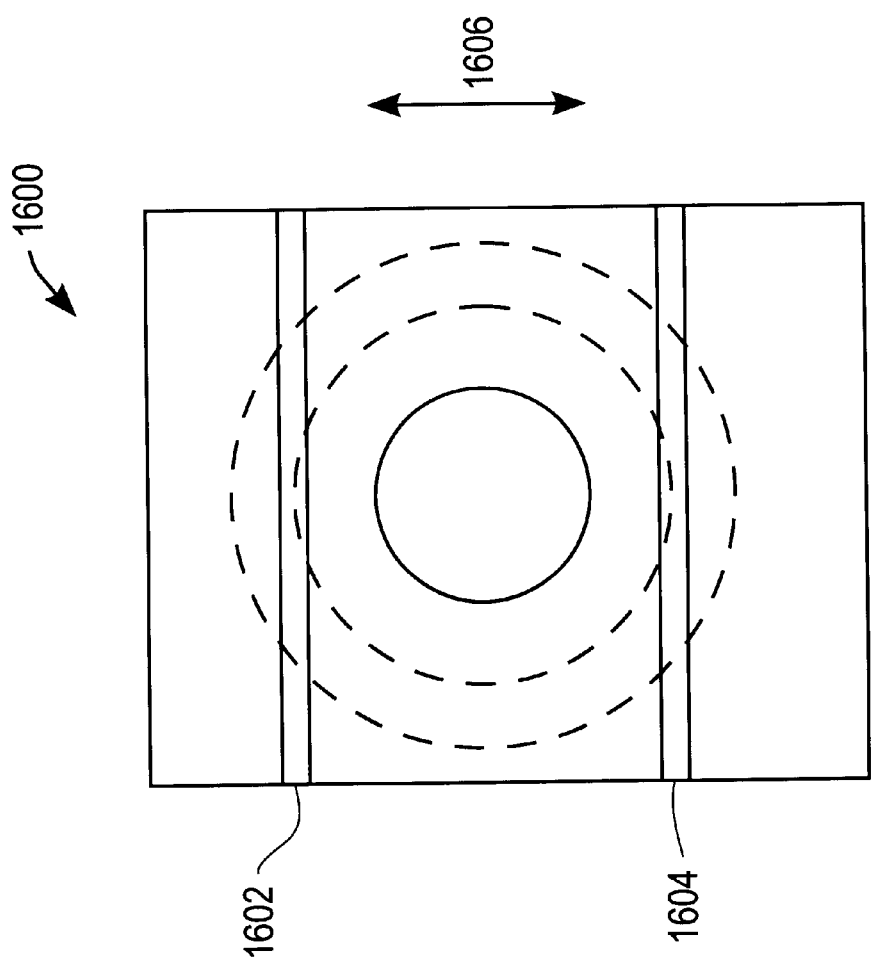
FIG. 16a is diagram of one embodiment of a slider body and airbearing surface.
Figure 16B:
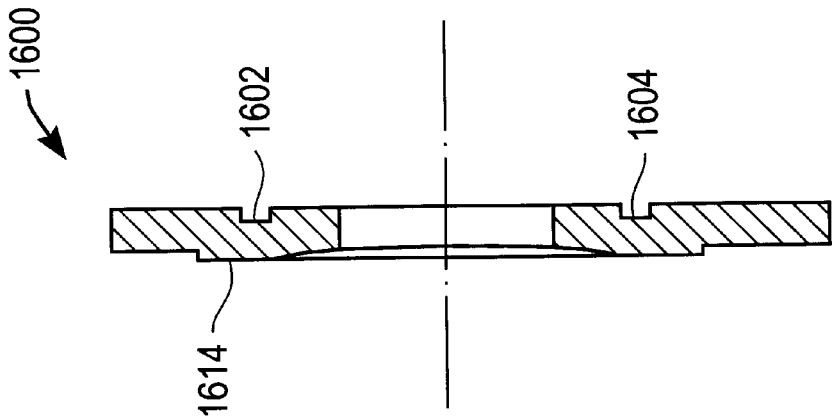

FIG. 16*a* is an embodiment of a slider body 1600. Slider body 100 includes grooves 1602 and 1604 perpendicular to the direction of air flow shown by arrow 1606. In one embodiment, grooves 1602 and 1604 are 0.05 to 0.5 mm deep. The groove closest to the leading edge of slider body 1600 assists with damping the motion of slider body 1600. FIG. 16*b* is a cross-sectional view of slider body 1600 showing flange 1614.

FIG. 17*a* is an embodiment of a slider body 1700. Slider body 1700 includes transverse groove that assists with damping the motion of slider body 1700. Two air bearing pads 1704 and 1706 have different widths. This arrangement reduces flying roll. Flying roll occurs because the velocity of the air passing over the pad that is closer to the outer diameter of the MO disc is greater than that of the air passing over the pad that is closer to the inner diameter of the MO disc. Assuming that pad 1704 is closer to the outer diameter of the MO disc when air is traveling in the direction of arrow 1716, the increased surface area of pad 1704 will compensate for the increased air velocity.

FIG. 17b is a cross-sectional view of slider body 1700 showing flange 1714.

Figure 18B:
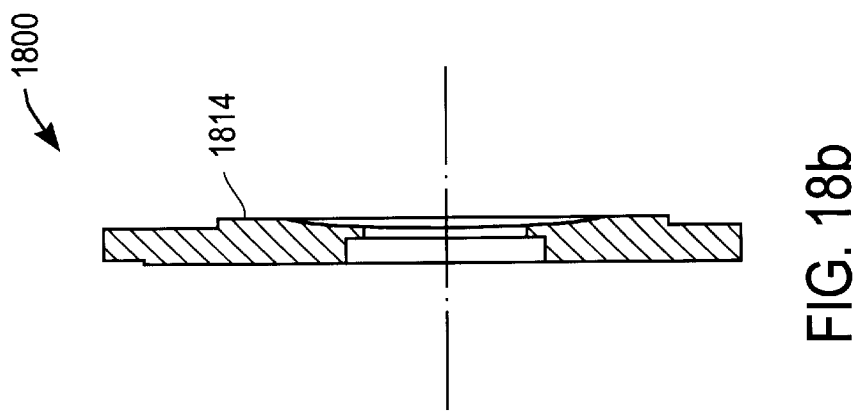
Figure 18A:
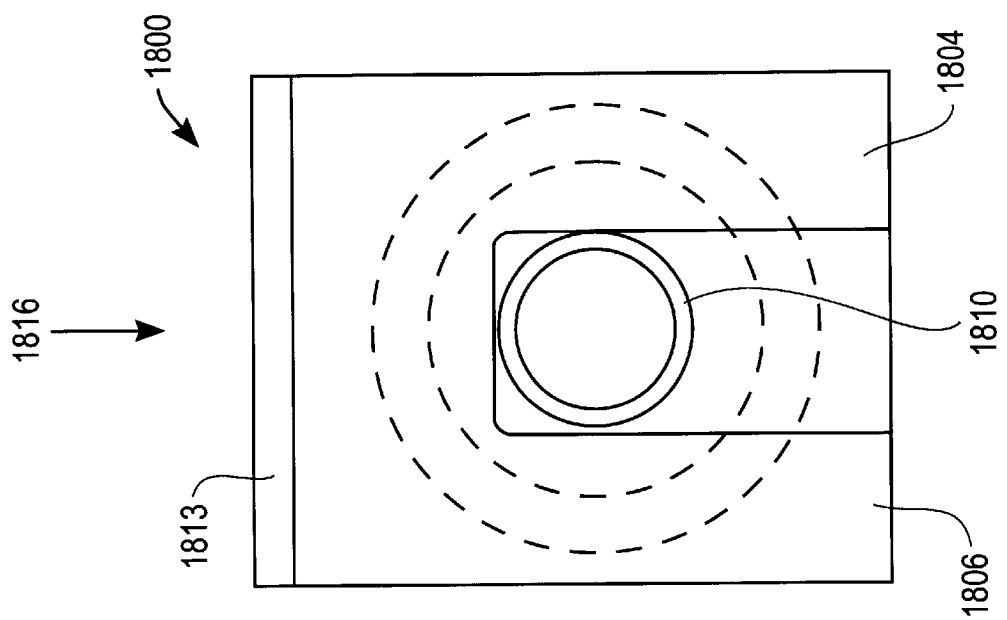
FIG. 18a is diagram of one embodiment of a slider body and airbearing surface.

FIG. 18a is an embodiment of a slider body 1800 that includes leading edge ramp 1813. The direction of air flow is shown by arrow 1816. Slider body also includes air bearing pads 1804 and 1806. Pad 1804 has greater surface area than pad 1804. Recessed seat 1810 forms a laser light channel and also accommodates a magnetic head. Recessed seat 1810 provides for automatic alignment of a magnetic head with slider body 1800 at assembly. FIG. 18b is a cross-sectional view of slider body 1800 showing flange 1814.

FIG. 19a is an embodiment of a slider body 1900 that includes air bearing pads 1904 and 1906. Pad 1904 has greater surface are than pad 1906. Pads 1904 and 1906 are not joined, but each include a leading edge ramp (1917 and 1919, respectively). Slider body 1900 includes recessed seat 1921 for accommodating a magnetic head. The direction of air flow is shown by arrow 1916. FIG. 19b is a cross-sectional view of slider body 1900 showing flange 1914.

Figure 20B:
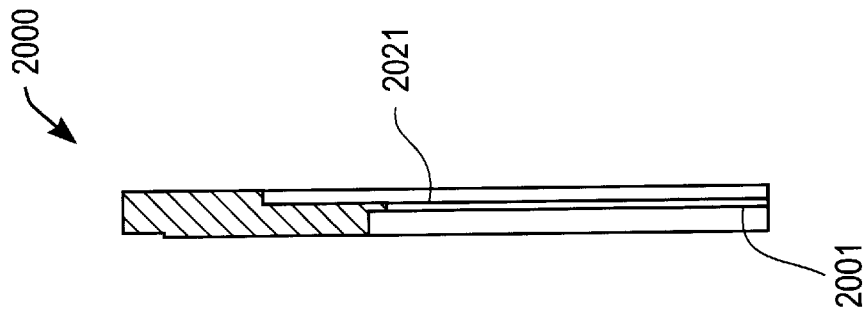
Figure 20A:
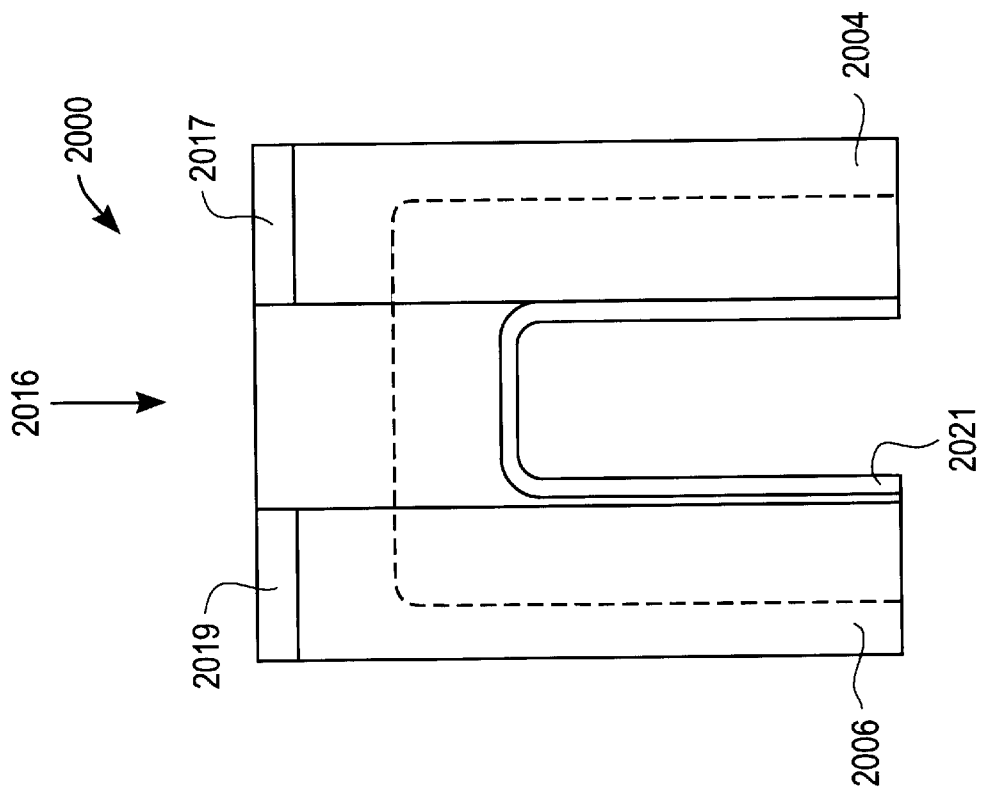
FIG. 20a is diagram of one embodiment of a slider body and airbearing surface.

FIG. 20a is an embodiment of a slider body 2000. Slider body 2000 includes air bearing pads 2004 and 2006 that include leading edge ramps 2017 and 2019, respectively. Pad 2004 has greater surface are than pad 2006. Slider body 2000 also includes recessed seat 2021 for accommodating a magnetic head. The direction of air flow is shown by arrow 2016.

FIG. 20b is a cross-sectional view of slider body 2000 showing flange 2014 and seat 2001 for mating with a suspension.

Various slider body configurations such as those shown in the figures may be selected for a particular operation depending on the stability and stiffness required of the flying head in operation. Other concerns that contribute to the choice of a particular design relate to tribology in that certain designs may knock off or trap contaminants differently. In addition, a slider body design may be chosen based on the desired flying height of the magnetic head assembly. For example, a greater flying height usually requires greater surface area for the slider body. In drives in which miniaturization is a major concern, in other words in a drive in which there is very little clearance for a read/write head, a low flying height and, consequently, a small slider body may be appropriate.

Various combinations of features of the slider body embodiments shown may be made by one skilled in the art without departing from the scope of the invention.

According to one embodiment, the slider body is formed of plastic by injection molding. Injection molded plastic slider bodies are significantly less expensive in material and fabrication costs than prior art ceramic slider bodies. Because the present invention is usable in systems in which the flying height of the head is relatively great, the flatness requirement is not as stringent as low-flying designs. Because the present invention is usable in systems with dynamic loading and unloading, contact-start-stop events are not in the normal use pattern and therefore the slider body does not need to have superior wear characteristics. Another reason that injection molded plastic slider bodies are relatively inexpensive is that the coil may be bonded to the slider body as opposed to prior sputtering, glass bonding, or lapping of the magnetic core.

What is claimed is:

1. A magneto-optical (MO) disc drive, comprising:
    a fine-focus actuator block including an objective lens, wherein a coarse carriage block moves laterally above a surface of a MO disc to position the objective lens;
    a flat suspension having a first end and a second end, wherein the first end is fixedly attached to the fine-focus actuator block and the second end is manipulated by a load/unload mechanism of the coarse carriage block;
    a gimbal moveably attached to an opening in a surface of the suspension; and
    a magnetic head assembly attached to the gimbal, wherein the magnetic head assembly is loaded and unloaded by the load/unload mechanism independent of the objective lens.

2. The MO disc drive of claim 1, wherein the magnetic head assembly comprises:
    a slider body; and
    a coil fixedly attached to an opening in the slider body, wherein the coil forms a light groove for laser light to pass through during read and write operations.

3. The MO disc drive of claim 2, wherein the slider body is annular and includes a step in an inner diameter of the slider body wherein the coil is bonded to the step.

4. The MO disc drive of claim 2, wherein the slider body is rectangular and includes two parallel air bearing pad areas that form an open area therebetween through which laser light passes during read and write operations.

5. The MO disc drive of claim 3, wherein the slider body includes a flange one side that is shaped to fit into the gimbal.

6. The MO disc drive of claim 4, wherein the slider body includes a flange one side that is shaped to fit into the gimbal.

7. The MO disc drive of claim 4, wherein the two air bearing pad areas are connected by an air bearing pad area that is on a side of the slider body facing into a direction air flow over the slider body during operation of the MO disc drive.

8. The MO disc drive of claim 7, wherein the air bearing pad area that connects the two air bearing pad areas includes a chamfer on an edge facing the direction of air flow and on a side facing an MO disc during operation of the MO drive.

9. The MO disc drive of claim 4, wherein each of the two air bearing pads includes a groove therein that is parallel to the direction of air flow.

10. The MO disc drive of claim 2, wherein the slider body is manufactured of injection molded plastic and wherein the coil is bonded to the slider body.

11. The MO disc drive of claim 10, wherein the coil is formed of wire wound to form an oval central opening through the coil that is conical in cross-section.

12. The MO disc drive of claim 2, wherein a surface of the slider body that faces an MO disc during operation of the MO disc drive includes at least one groove therein in a direction that is perpendicular to a direction of air flow over the slider body during operation.

13. The MO disc drive of claim 1, wherein the flat suspension is formed of one piece of material and includes a mounting plate with a first surface fixedly attached to the first end.

14. The MO disc drive of claim 13, wherein the mounting plate includes an angled surface opposing the first surface, and wherein the angled surface is fixedly attached to the fine-focus actuator block so as to produce an angle between the suspension and an MO disc to create a gram load.

15. The MO disc drive of claim 1, wherein the flat suspension is formed of one piece of material and includes a mounting plate with an angled surface fixedly attached to the first end.

16. The MO disc drive of claim 15, wherein the mounting plate includes a flat surface opposing the first surface, and wherein the flat surface is fixedly attached to the fine-focus actuator block so as to produce an angle between the suspension and an MO disc to create a gram load when the suspension is positioned over the MO disc.

17. The magneto-optical (MO) disc drive of claim 1, wherein the first end of the suspension includes ears for aligning the suspension with the disc drive such that laser light may travel through the suspension during read and write operations.

* * * * *